(12) United States Patent
Kukor et al.

(10) Patent No.: US 6,746,180 B2
(45) Date of Patent: Jun. 8, 2004

(54) REMEDIATION OF CONTAMINATES INCLUDING LOW BIOAVAILABILITY HYDROCARBONS

(75) Inventors: Jerome J. Kukor, East Windsor, NJ (US); Kyoungphile Nam, Seoul (KR)

(73) Assignee: Rutgers, the State University of New Jersey, Piscataway, NJ (US)

( * ) Notice: Subject to any disclaimer, the term of this patent is extended or adjusted under 35 U.S.C. 154(b) by 0 days.

(21) Appl. No.: 10/459,899

(22) Filed: Jun. 12, 2003

(65) Prior Publication Data

US 2003/0210957 A1 Nov. 13, 2003

Related U.S. Application Data

(63) Continuation of application No. 09/863,491, filed on May 23, 2001, now Pat. No. 6,623,211.
(60) Provisional application No. 60/206,703, filed on May 23, 2000.

(51) Int. Cl.$^7$ .............................. B09C 1/10; A62D 3/00; C02F 1/72
(52) U.S. Cl. .............................. 405/128.75; 405/128.1; 405/128.15; 405/128.45; 588/205; 210/758
(58) Field of Search ................................. 210/747, 758, 210/759; 588/205; 405/128.1, 128.45, 128.5, 128.7, 128.75

(56) References Cited

U.S. PATENT DOCUMENTS

| | | | | |
|---|---|---|---|---|
| 4,321,143 A | * | 3/1982 | Wilms et al. ................ 210/631 |
| 4,569,769 A | * | 2/1986 | Walton et al. ............... 210/759 |
| 4,591,443 A | * | 5/1986 | Brown et al. ................ 166/300 |
| 5,232,484 A | * | 8/1993 | Pignatello .................... 210/739 |
| 5,345,031 A | * | 9/1994 | Schwartz et al. ............ 588/206 |
| 5,436,160 A | * | 7/1995 | Varadaraj et al. ........... 435/262 |
| 5,525,008 A | | 6/1996 | Wilson |
| 5,610,065 A | | 3/1997 | Kelley et al. |
| 5,741,427 A | | 4/1998 | Watts et al. |
| 5,756,304 A | * | 5/1998 | Jovanovich .................... 422/50 |
| 5,840,191 A | * | 11/1998 | Eccles ......................... 204/520 |
| 5,904,832 A | * | 5/1999 | Clifford et al. ............. 204/242 |
| 5,955,350 A | | 9/1999 | Soni et al. |
| 6,046,375 A | * | 4/2000 | Goodell et al. .............. 210/763 |
| 6,090,287 A | * | 7/2000 | Carman et al. .............. 210/614 |
| 6,160,194 A | * | 12/2000 | Pignatello ................... 210/759 |
| 6,251,657 B1 | * | 6/2001 | Hunter et al. ............... 435/248 |

OTHER PUBLICATIONS

Lopes, et al., Polyphenol tannic acid inhibits hydroxyl radical formation from Fenton reaction by complexing ferrous ions, Biochimica et Biophysica Acta 1472 (1999) 142–152.

Nappi et al., Hydroxyl radical formation via iron–mediated Fenton chemistry is inhibited by methylated catechols, Biochimica et Biophysica Acta 1425 (1998) 159–167.

Harayama, Polycyclic aromatic hydrocarbon bioremediation design, Current Opinion in Biotechnology 1997, 8:268–273.

Korda et al., Petroleum hydrocarbon bioremediation: sampling and analytical techniques, in situ treatments and commercial microorganisms currently used, Appl Microbiol Biotechnol (1997) 48:677–686.

Bajpai et al, Bioremediation of Surface and Subsurface Contamination, Annals of the New York Academy of Sciences, (1997) 829: 36–61.

Mentasti et al. Electron–transfer reactions of benzene–1, 2–diols with hexachloroiridate–(IV) in acid perchlorate media. J.S.C. Dalton 24, 132–135 (1977).

\* cited by examiner

*Primary Examiner*—J. J. Swann
*Assistant Examiner*—Katherine W Mitchell
(74) *Attorney, Agent, or Firm*—Hoffmann & Baron, LLP

(57) ABSTRACT

A method of treatment of a contaminated material contaminated with an organic compound. The method includes treating the contaminate with a chemical oxidation step and a bioremediation step. The chemical oxidation step includes treating the contaminate with the following: a transition metal in soluble form in combination with an isolated chelator of the transition metal, to form a transition metal-:chelator complex; an oxidizing agent that provides a reactive free radical in the presence of the transition metal complex; and a buffering compound; the pH being maintained in a neutral range. The method of treatment further includes treating the contaminate with a microbial consortium including at least two species prior to or after the chemical oxidation step to enhance the remediation process.

53 Claims, No Drawings

REMEDIATION OF CONTAMINATES INCLUDING LOW BIOAVAILABILITY HYDROCARBONS

RELATED APPLICATIONS

This application is a continuation of U.S. Pat. No. Ser. No. 09/863,491 filed May 23, 2001 now claims the benefit of U.S. Pat. No. 6,623,211, which claims benefit of U.S. Provisional Application Serial No. 60/206,703 entitled: "COBR: Combined Oxidation and Biotreatment for Remediation of Soils Contaminated with Low Bioavailability Hydrocarbons," filed May 23, 2000.

This work was supported by a grant (Project SITE-57) from the New Jersey Hazardous Substance Management Research Center and was funded in part by a grant from the National Institutes of Environmental Health Sciences through Superfund Basic Research Program Grant P42-ES-04911. The government may have certain rights to this invention.

FIELD OF THE INVENTION

The present invention relates to the field of remediation of chemical contamination, including for example, contamination in particulates such as soil and also in fluids such as groundwater. More particularly, the present invention relates to a method of efficiently treating particulates and fluids contaminated with organic materials, such as hydrophobic aromatic hydrocarbons using biocompatible methods for oxidation of the organic contaminants.

BACKGROUND

Chemical contamination of the environment, particularly of soil and groundwater is currently a widespread problem that is prevalent in many parts of the industrialized world. Industrial pollution has contaminated millions of acres of soil and associated aquifers. Often, cleanup of the contamination is avoided because of the costs of remediation, and the land may remain unused or abandoned.

Typical remediation (decontamination) strategies include incineration and/or removal. In the case of contamination of large areas, an on-site incinerator may be warranted. In other cases, generally on a smaller scale, excavation and removal to an RCRA (Resource Conservation & Recovery Act) compliant incinerator or landfill may be employed. Both of these methods require intensive labor and mechanical effort resulting in high costs. Other methods in frequent use include pumping and treating, vacuum extraction, steam flooding, air sparging and soil flushing.

Treatment of contaminated soils in situ by various methods has been pursued because it does not require excavation or hauling and is less costly. Oxidation is one technique used to treat contaminated soils in situ. For example, one such oxidation technique that has been widely used is oxidation of organic compounds with ozone, potassium permanganate or hydrogen peroxide.

Additionally, efforts have been made to reduce the costs of treatment with chemicals by more effectively directing the chemicals used in the treatment to the contaminated soil to the appropriate location and depth. For example, U.S. Pat. No. 5,525,008 to Wilson discloses a method of directing the flow of the oxidizing treatment solutions to contaminants in the soil or groundwater. The invention discloses the use of multiple horizontally spaced sealed injection wells, with the goal of directing the reactive solution through the contaminated area.

Another approach at directing treatment chemicals to the contaminates in soil is disclosed by U.S. Pat. No. 4,591,443 to Brown. The '443 patent discloses a method of decontaminating subterranean soil by controlling the mobility of aqueous treatment fluids. In order to direct the treatment fluid containing the active chemical, such as hydrogen peroxide to the intended reaction site, hydratable polymers are used as viscosity modifiers. Optionally, cross linking agents may be added to further increase the viscosity of the treatment fluid. Surfactants are employed to decrease the interaction of metals or clays with peroxide. The '443 patent further discloses the use of peroxide stabilizers, free radical initiators such as iron (Fe) and also free radical inhibitors. Penetrating pre-treatment fluids for altering the reactivity of the soil or rock formation and inactivating hydrogen peroxide decomposition catalysts are also disclosed.

The '443 patent teaches that these various oxidation and flow modifiers combine to provide a degree of spatial and temporal control of the oxidizing treatment chemicals, with the stated intention of reacting with the desired chemical contaminants rather than the surrounding naturally occurring minerals and soil. The '443 patent does not address the use of bioremediation, to treat many common forms of contamination, particularly organic contaminants such as polycyclic aromatic hydrocarbons (PAHs), thereby permitting reduced chemical exposure and loading of the site. The '443 method would be expected to produce poor oxidation of, e.g. anthracene and chrysene, and other such hydrocarbons.

Bioremediation has begun to gain wider acceptance as a viable treatment technology for remediating soils, sediments and subsurface sites contaminated with hydrocarbons. The attractiveness of bioremediation arises at least in part from the fact that the process takes advantage of intrinsic biodegradative processes of microorganisms and because the compounds that are the target of remediation are degraded to innocuous end products. In this respect, bioremediation-based remediation approaches using either in situ or off site designs have been successfully employed for remediation of soils and subsurface sites contaminated with lighter fractions of petroleum or petroleum products, and for the lower molecular weight and more water soluble aromatic components of petroleum products, represented, for example, by benzene, toluene, ethylbenzene and xylenes.

Bioremediation strategies, however, often have limited applicability when soils, sediments and subsurface sites are contaminated with complex mixtures of highly hydrophobic aromatic compounds such as commonly occurs for instance with tar residues. The polycyclic aromatic hydrocarbons (PAHs) that are component of tar residuals, remain a challenge for the application of in situ remediation strategies owing to the low aqueous solubility of mixed PAH components. Such PAHs are produced, for example, from the volatile components of bituminous coals in coal carbonization, from the residue of gasifying oils in oil gas processes, and from the cracking of enriching oils in carbureted water gas production at former manufactured gas plant (MGP) sites. Bioremediation of such PAH-contaminated sites is hampered by the low aqueous solubility of PAH compounds, which leads to low bioavailability where the compounds are not available for microbial action that depends on aqueous chemistry and enzyme action.

Hydrogen peroxide, in the presence of ferrous ions ($Fe^{++}$) as a catalyst, generates a strong nonspecific oxidant hydroxyl radical that reacts with most organic compounds at diffusion-controlled rates of $10^7$ to $10^{10}$ $M^{-1}$ $sect^{-2}$. This is known as Fenton's reaction and has been used for the destruction of organic contaminants including (poly) chlorinated aromatic compounds and a variety of herbicides in aqueous solutions or soils. However, little evidence is available regarding whether the Fenton's reaction can mineralize organic contaminants, or whether the resulting partially oxidized organic compounds pose less hazards than the parent compounds. Moreover, use of Fenton's reaction produces soil pH changes which are incompatible with bacteria and make subsequent use of bioremediation methods ineffective.

Although Fenton's reagent has the potential to nonspecifically oxidize many PAHs, it also results in a substantial lowering of the soil pH, e.g. to a pH of between 2 and 3. At these pH levels, many heavy metal contaminates become solubilized and migrate into ground water. Moreover, this pH range is subsequently incompatible with many forms of biological treatment.

As noted above, one serious disadvantage of the use of chemical oxidation with bioremediation is the lowering of soil pH to levels which solubilize many heavy metals and which are unacceptable for sustaining many useful bacteria. Nonetheless, various attempts at treating contaminated soils have included a combination of bioremediation and chemical treatment.

U.S. Pat. No. 5,955,350 to Soni et al. discloses the stepwise use of biological treatment, then chemical treatment followed by another biological treatment of organic waste. Hydrogen peroxide is a strong oxidant and is very reactive. The '350 patent discloses the use of Fenton's reagent and peroxide between two stages of biological remediation.

One severe drawback of the use of Fenton's reagent is that in some circumstances, the rapid reaction of peroxide can result in excessive heat and consequent generation of steam, creating high pressures and potentially resulting in an explosive release. In the field, various approaches to the problem of explosive potential are used. These include adaptations such as venting the formation or utilizing a slow introduction of the peroxide. The '350 patent discloses a slow rate of addition of peroxide in order to avoid high rates of oxidation. Manageable temperatures are maintained by slow addition of hydrogen peroxide, exemplified by the addition of an approximate rate of 1 to 100 mg hydrogen peroxide per hour per gram of contaminated soil to the ferrous salt solution.

U.S. Pat. No. 5,610,065 to Kelley et al. also discloses combined chemical and biological remediation including the use of Fenton's reagent for degradation of high molecular weight PAHs in soil. The '065 patent is silent as to pH control during the oxidation process. It is not surprising, therefore, that the '065 patent follows chemical oxidation with additional microbial inoculation in an effort to restock the microorganism population after exposure to the harsh oxidation conditions. The '065 patent also discloses the use of a lower alcohol to increase the aqueous solubility of PAHs.

U.S. Pat. No. 5,741,427 to Watts utilizes stabilizers to provide chemical ligands for Fe(III) species during Fenton's oxidation. The stabilizer ligands are provided by phosphates, silicates, or citrates. Control of pH is not addressed. Similarly, the aforementioned problems associated with oxidation of soil contaminants are not addressed.

To date the known methods which employ oxidation and/or bioremediation techniques to treat contaminated soils all suffer from the various disadvantages discussed above. It would therefore be desirable to provide a means by which oxidation of contaminates can occur efficiently without the need for undesirable changes in pH. There is a need for a remediation method that is operational in a neutral pH range with increased biocompatibility and that reduces the solubilization of heavy metals. It would also be desirable to provide a treatment method which avoids further contamination due to the formation of unwanted or toxic by-products as a result of the treatment.

SUMMARY OF THE INVENTION

The invention provides a method of treatment of a contaminated material, herein referred to as a contaminate, contaminated with an organic compound. The method includes the steps of: providing a contaminate that is contaminated with an organic compound, and treating the contaminate with a chemical oxidation step. The chemical oxidation step includes: contacting the contaminate with a transition metal in soluble form; and a chelator of the transition metal, (such that the chelator of the transition metal and the transition metal form a transition metal:chelator complex); and an oxidizing agent that provides a reactive free radical in the presence of the transition metal complex; and a buffering salt to maintain the pH in the neutral range. The method provides a reactive free radical that initiates a chemical reaction with the organic compound to produce reaction products of the organic compound.

The method of treatment may further include pre-treating the contaminate with a biodegradation step prior to or after the chemical oxidation step. The biodegradation step includes a step of contacting the contaminate with a microbial consortium under conditions suitable for the consortium to mediate solubilization or biodegradion of the organic compound.

The invention also provides a kit for treatment of a contaminate contaminated with an organic compound, the kit comprising: (i) a transition metal in soluble form; (ii) a chelator of the transition metal that has the property of forming a transition metal:chelator complex with the transition metal; and (iii) and a buffering salt to maintain the pH in the neutral range. The kit may further comprise a microbial consortium having the property of solubilizing or biodegrading an organic compound contaminant.

The invention further provides a method of producing a reactive free radical in an aqueous medium in a neutral pH range, by providing a transition metal in soluble form in an aqueous medium, along with a chelator of the transition metal, such that the chelator of the transition metal and the transition metal form a transition metal:chelator complex; a buffering salt is optionally included to maintain the pH in a neutral range with an oxidizing agent that provides a reactive free radical in the presence of the transition metal:chelator complex.

DETAILED DESCRIPTION OF THE INVENTION

The present inventors have discovered methods that are safer, more effective and less expensive than the known methods for degrading organic contaminants present in particulate materials or in liquid wastes. The methods are also effective for the degradation of pollutants, the reduction of toxicity, the reduction of chemical or biological oxygen demand and the removal of odors or color of a contaminate. The method involves oxidation of the contaminant compounds by chemical treatment with optional biodegradation steps. These methods are particularly effective in remediating organic contaminants, especially hydrocarbons that may have low solubility and low bioavailability. Such contaminants are poorly if at all transformed by natural processes alone.

Particulate materials such as soils and solid waste materials include for instance, gravel, pebbles, stone, stone chips, rock, ore, mining waste, coal, coke, slag, concrete, brick, construction material, demolition material, vermiculite, synthetic resin or plastic. Liquid wastes, include for example, industrial effluents in pools or holding ponds, contaminated ground water, liquid sludge as well as less polluted aqueous run off. Such contaminated particulates, solids and liquids, are hereinafter interchangeably referred to as contaminates. Preferably the contaminate is soil or ground water.

As used in the present specification the term "contaminate" refers to any matter containing an undesirable chemical component or pollutant. Examples of such undesirable chemical components or pollutants include, for instance, toxic chemicals, carcinogens, organic compounds, polycyclic compounds, aromatic compounds, aliphatic compounds, olefinic compounds, ethynic compounds, acids, bases, alcohols, dyes, oils and the like.

Among the contaminants that may be addressed by the methods of the present invention are the following listed for exemplification only and are in no way to be considered as limiting: hydrocarbons, polyaromatic hydrocarbons (PAHs); dense non-aqueous phase liquids (DNAPLs) and light non-aqueous phase liquids (LNAPLs); solvents, particularly chlorinated solvents; tars and creosote; petroleum products and byproducts such as: any one or combination of the following—benzene, toluene, ethyl benzene and xylene (known as BTEX), PAH, TPH and diesel fuel; chlorinated hydrocarbons such as vinyl chloride, trichloroethylene (TCE), tetrachloroethylene, TCA, DCA, PCA and PCBs; chlorinated dioxins and dibenzofurans; phenolics; preservatives; pesticides; explosives and unspent munitions.

As used in the present specification the term "the neutral range" used in reference to a pH range refers to a pH in a range around the neutral pH, which is pH of about 7. Preferably the pH is in a range from about pH 5 to about pH 8. More preferably the neutral pH range is from about pH 5.5 to about pH 7. Optimally the neutral pH range as referred to herein is from about 6 to about 6.5.

As used herein the term "buffering salt" means any salt maintains the pH in the neutral range. Preferably the buffering salt is soluble in acidic solution. The buffering salt may have a $pK_a$ in the range of about 5 to about 8. A preferred buffering salt is calcium carbonate ($CaCO_3$).

In one aspect the present invention provides a method of treatment of organic compounds in a contaminate using a chemical oxidation process. The treatment is effective for remediation of water-insoluble, toxic, carcinogenic and environmentally persistent organic compounds, particularly those with a bioavailability too low for effective use of direct bioremediation methods.

The chemical oxidation treatment of the present invention is mediated by a reactive free radical, that may be an oxidizing free radical produced by the action of a transition metal ion on an oxidizing agent at a pH in the neutral range. The oxidizing free radical may be any oxidizing free radical produced by the action of a transition metal ion on an oxidizing agent, such as for example the oxidizing free radicals .OH or .OOH, produced by the action of a transition metal ion:chelator complex on hydrogen peroxide.

The transition metal ion is stabilized by a metal chelator and the pH is maintained by the addition of a buffering salt. The reactive free radical initiates a chemical reaction with the organic compound contaminants that results in remediation of the contamination, such that the organic compounds are remediated. Preferably, remediation of the organic contaminants results in one or more of the following: the organic compound is solubilized, rendered more bioavailable, oxidized, degraded, decomposed, detoxified or mineralized.

In another aspect of the invention there is provided a method which combines oxidation and bioremediation of contaminants and which provides a means to control the pH to provide an environment suitable for chemical and biological transformations by microorganisms. Suitable microorganisms include any microorganism capable of oxidation of a contaminant, especially such microorganisms as bacteria, actinomycetes and fungi. A suitable microorganism may be used as a single microbial species. Preferably, however, the microorganisms exist as a population of two or more species, which may be of different genera. Such a population of two or more suitable microorganisms is a herein referred to as a consortium. Yet more preferably, the consortium performs its natural degradative processes on the contaminants.

In yet another aspect the invention provides a method for decontaminating or remediating contaminated soil and water by providing to a soil a consortium of microorganisms, selected to degrade known contaminants which may be present in the soil, and allowing the microorganisms to degrade the contaminants in situ. Additionally, the soil remediation provided by the selected consortium may be further enhanced by introducing chemical oxidation treatment, prior to, simultaneously with or subsequent to the introduction of the microbial consortium. The oxidation is desirably carried out while maintaining a biocompatible pH to permit the consortium to degrade the contaminants. Preferably, the consortium is capable of this transformation as a natural degradation process, though selection may be applied to the consortium to enhance the degradative activity.

A particular advantage of the methods taught herein is that these methods are compatible with the biological degradative processes mediated by the microorganisms introduced as microbial consortia, though the introduction of single species of microorganisms to perform this function is also contemplated. The degradative processes mediated by the microorganisms or consortia may be natural processes of the microorganisms.

Microorganisms present in a preferred consortium useful in the methods of the present invention include *Sphingomonas yanoikuyae*, Sphingomonas species., and Pseudomonas species. In another preferred consortium the microorganisms include Burkholderia species, Ochrobactrum species, and Actinomyces species.

Other useful microorganisms in the methods of the present invention that involve bioremediation include: *Pseudomonas aeruginosa* (ATCC 15522-28, 21472); Pseudomonas species (NRRL 18064); *Alcaligenes faecalis* (ATCC 8750); *Alcaligenes eutrophus* (NRRL 15940); *Rhodotorula rubra* (ATCC 16639); *Rhodococcus globerulus* (NRRL 55255), and *Xanthomonas maltophilia* (ATCC 25556).

The microorganisms may be delivered by any one of the many well known methods. Examples include for instance, those described in the following references which are not to be construed as limiting in any way:

Newcombe, D. A., and D. E. Crowley. 1999. Bioremediation of atrazine-contaminated soil by repeated applications of atrazine-degrading bacteria. *Appl Microbiol Biotechnol.* 51(6):877–82.

Barbeau, C, L. Deschenes, D. Karamanev, Y. Comeau, and R. Samson. 1997. Bioremediation of pentachlorophenol-contaminated soil by bioaugmentation using activated soil. *Appl Microbiol Biotechnol.* 48(6):745–52.

The inventors have discovered a method of oxidation of hydrocarbon contaminants in situ that is biocompatible. This biocompatibility means that microorganisms may be employed at any of the various stages of the method. This method therefore allows combined chemical oxidation treatments with biodegradation steps with a microbiological culture or consortium. The microbiological treatments steps bring the advantages of microbiological remediation to the treatment methods of the present invention. These advantages include low environmental impact, low cost of the microbiological culture or consortium, mild conditions of use and ease of application of the microbiological culture or consortium to the contaminate before, during or after the chemical remediation treatment steps as taught herein.

The inventors further provide a generally useful method of producing a reactive free radical under very mild conditions in an aqueous medium at a neutral pH. The method essentially includes providing a transition metal in aqueous soluble form, along with a chelator of the transition metal, to form a transition metal:chelator complex; a buffering salt may be included to maintain the pH in a neutral range and an oxidizing agent is added to provide the reactive free radical in the presence of the transition metal:chelator complex. Such complexes are interchangeably referred to as transition metal:chelator complexes or chelates in this specification.

The standard Fenton's reaction involves the production of a hydroxyl radical by the action of ferrous ions on hydrogen peroxide, to release a ferric ion and a hydroxyl ion along with the hydroxyl radical. The ferric ion then catalyses the production of an oxyhydroxyl radical and a hydrogen ion from the hydrogen peroxide and reforms the ferrous ion. This reaction is carried out at low pH. The hydrogen peroxide is introduced slowly to avoid explosive decomposition to oxygen catalyzed by the transition metal, which is in this case, iron.

In the methods of the present invention, a buffering salt is added to maintain the acidity at a neutral or near neutral pH. The transition metal is further stabilized by the binding of the chelating agent. These modifications prevents the precipitation of the transition metal as an insoluble salt and further renders the entire process more biocompatible. The bioavalable degradation products may then be further degraded by any added microbial culture or consortium that is introduced.

Addition of reagents may be in any order and as transition metal chelates or separately such that the chelates form in situ. In the case where the transition metal salt is a ferrous or ferric salt, the chelating agent stabilizes the ferric form and prevents precipitation of the ferric salts particularly ferric hydroxide.

Reaction times vary with the prevailing conditions, such as temperature, contaminant organic compound and reagent (transition metal ion, chelating agent and hydrogen peroxide) concentrations. Significant degradation may occur over several days, though reaction times of less than 1–2 days are preferred and reaction times of 24 hours or less are optimally preferred.

Delivery of the chemical reagents for the method of the present invention may be achieved by any of a variety of methods well known and set forth in the art. These include for example the methods described in the following references:

Watts, R. J., D. R. Haller, A. P. Jones, and A. L. Teel. 2000. A foundation for the risk-based treatment of gasoline-contaminated soils using modified Fenton's reactions. *J Hazard Mater.* 76(1):73–89.

Kao, C. M., and M. J. Wu. 2000. Enhanced TCDD degradation by Fenton's reagent preoxidation. *J Hazard Mater.* 74(3):197–211.

Arienzo. M. 2000. Use of abiotic oxidative-reductive technologies for remediation of munition contaminated soil in a bioslurry reactor. *Chemosphere.* 40(4):441–8.

Hayes, T. D., D. G. Linz, D. V. Nakles, and A. P. Leuschner (Eds.). 1996. *Management of manufactured gas plant sites*, vol. 2. [p. 427–437: Chemical Oxidation]. Amherst Scientific Publishers, Amherst, Mass.

The combination of chemical oxidation and biodegradation of the present invention has the great advantage over either treatment alone in the remediation of organic contaminants: The use of Fenton's reagent with biodegradation provides increased effectiveness in part because oxidized organic compounds (such as polyaromatic hydrocarbons, PAHs) are more water soluble than the original contaminants. The increased solubility leads to higher bioavailability and in turn the higher bioavailability results in more extensive remediation.

The inventors have discovered that oxidation methods for remediation of contaminates using transition metals and oxidizing agents accompanied by the introduction of a complexing or chelating agent for the transition metal can be conducted without the usual decrease in soil pH. This feature of pH maintenance provides several advantages. For example, the use of the complexing or chelating agent to modify Fenton's reagent chemistry allows for the maintenance of pH at levels suitable to sustain bacteria and further permits microbial action to enhance the remediation process.

The advantages of maintaining biocompatible pH levels include the ability to contemporaneously obtain effective bioremediation by naturally occurring and/or introduced bacteria. Furthermore, use of a chelating agent eliminates the concern of an acidified soil environment which is associated with the original Fenton reaction. Among such complexing agents are included hydroxylated benzenes, which have been found to be especially useful. More desirably, dihydroxybenzene provides particularly desirable results.

The transition metals useful in practicing the present invention include manganese, iron, cobalt, nickel, copper and zinc, with iron salts being preferred, the iron salt preferably being a sulfate, a perhalate or a nitrate. More preferably the iron is a Fe(II) ferrous salt or a ferric Fe(III) salt, and most preferably as an Fe(III) ionic species. The Fe(III) may be a sulfate or a nitrate, but is preferably a perhalate, such as perchlorate, perbromate or periodate, with perchlorate being optimally preferred.

Oxidizing agents useful in the methods of the present invention may be any of a number of oxidizing agents that provide a reactive free radical in the presence of a transition metal:chelator complex at a pH in the neutral range. Among the useful oxidizing agents are peroxides such as for example, hydrogen peroxide, which is especially preferred.

The chelating agents useful in the present invention may be any chelating agent that forms a transition metal chelate with the transition metal chosen for production of the reactive oxidizing free radical. Hydroxylated aromatic compounds are especially useful as chelating agents in these methods. Examples of useful chelating agents include hydroquinone, orcinol, resorcinol, trihydroxybenzene, salicylate, m-hydroxybenzoate, p-hydroxybenzoate, nitrilotriacetic acid and diethylenetriaminepentaacetate. Preferred chelating agents for use in combination with iron as Fe(II) or Fe(III) as the transition metal include the hydroxybenzenes and the hydroxybenzoic acids. Optimally, the chelating agents for use in combination with Fe(II) or Fe(III) are catechol (1,2 dihydroxybenzene) or gallic acid (3,4,5 trihydroxybenzoic acid).

The chelators are generally used in amounts sufficient to chelate the amount of transition metal introduced into the contaminate system. Desirably the ratio of transition metal::chelator complex to oxidizing agent may be any ratio from about five parts peroxide to one part iron by weight to about twenty parts peroxide to one part iron by weight. Optimally, the ratio of peroxide to iron is about ten parts peroxide to one part iron by weight.

It is important to note that the optimal ratio of peroxide to iron by weight may be affected by the type of contaminate and the amounts and the chemical composition of the contaminants therein. This ratio may be routinely determined for each contaminate on a small scale and applied on the a larger scale to the remediation or decontamination project at hand.

Gallic acid is among the hydroxybenzene chelating agents especially useful in the methods of the present invention. Gallic acid may be produced from plant tannins by standard well known chemical processes. The Materia Medica gives the following list of plant genera (along with examples given their common names) that are high in tannins and which would therefore be of value as inexpensive sources of tannins for the production of hydroxybenzene chelating agents, particularly gallic acid: Abies (Spruce), Agrimonia (Agrimony), Alnus (Alder), Betula (Birch), Cinnamomum (Cinnamon), Cola nitida (Cola Nuts), Ephedra (Mormon Tea), Fraxinus (Ash), Geranium (Cranesbill, Alum Root), Granatum (Punica, Pomegranate), Guaiacum (Lignum Vitae), Hamamelis (Witch Hazel), Heuchera (American Alum Root), Juglans (Walnut, Butternut), Ligustrum (Privet), Myrica (Bayberry), Orobanche (Broomrape), Potentilla (all), Prunus (Wild or Choke Cherry), Quercus (Oak), Rheum (Rhubarb), Rhus (all: Sumach), Rosa (Rose), Rubus (Blackberry, Raspberry), Vaccinium (Blue-/Huckle-/Bilberry), Xanthium (Cocklebur).

Without wishing to be bound by any particular theory, it is believed that the presence of the chelating agent stabilizes the reactive transition metal ion in the complex and prevents precipitation as a ferric salt without inhibiting the catalytic activity of the transition metal ion. The transition metal ion in the complex interacts with the oxidizing agent in the reaction mixture enhancing the production of a highly reactive oxidizing free radical. The avoidance of the low pH prevents solubilization of heavy metals and enhances the biocompatibility of the reaction. The products of the remediation reaction formed when contaminates react with the highly reactive oxidizing free radical are also generally less toxic than the products of the commonly available harsher chemical remediation methods.

In addition to chemical treatment, the present invention provides combined chemical remediation and bioremediation techniques. Although naturally occurring microorganisms may be relied upon to perform degradative processes contemporaneously with the chemical treatment process of the present invention, it is desirable to select a consortium of microorganisms known to be effective at degrading the contaminants in the soil, and introducing such a consortium prior to, during or subsequent to such chemical treatment.

For example, a consortium known to be effective in degrading PAHs such as, a consortium of Burkholderia spp., Ochrobactrum spp., and Actinomyces spp. can be introduced into the soil, and permitted to contemporaneously work along with chemical oxidation treatment. In this way, the advantages of both chemical treatment and bioremediation can be obtained.

The invention also provides a kit for treatment of a contaminate contaminated with an organic compound, the kit includes: a transition metal in soluble form; a chelator of the transition metal that has the property of forming a transition metal:chelator complex with the transition metal; and a buffering salt that is soluble in acidic solutions. The buffering salt may have a $pK_a$ suitable to maintain the pH in the neutral range. Preferably the buffering salt has a $pK_a$ in the range from about 5 to about 8.

The transition metals and transition metal chelators useful in the kits of the present invention are as described above. The transition metal chelator is most preferably catechol or gallic acid. The kits preferably also contain an oxidizing agent that reacts with the transition metal:chelator complex to form a reactive free radical. The preferred oxidizing agent is hydrogen peroxide.

The kit may further comprise a microbial consortium having the property of solubilizing or biodegrading an organic compound contaminant. Preferably the microbial consortium comprises one or more of the following: a bacterial species, a fungal species and an actinomyces species. The bacterial species, a fungal species and an actinomyces species that are particularly useful in the kits of the invention have been described above. These include one or more of the following: an Alcaligenes species, a Sphingomonas species, a Pseudomonas species, a Rhodotorula species, a Burkholderia species, an Ochrobactrum species, a Rhodococcus species, a Xanthomonas species and an Actinomyces species.

The following examples were conducted to test the efficacy and sequence of combined chemical oxidation and biodegradation in the remediation of soils contaminated with a mixture of PAH compounds from the site of a former manufactured gas plant (MGP).

EXAMPLES

Soil Samples and Chemicals. Quakertown silt loam was collected from the depth of 0 cm to 15 cm below the surface at the Snyder farm of Rutgers University (Pittstown, N.J.). The soil is free of PAHs and has never been exposed to anthropogenic input of PAH compounds. The soil was air-dried, passed through a 2-mm sieve, and sterilized by gamma irradiation (2.5 Mrad) from a $^{60}Co$ source (Ward laboratory, Cornell University, Ithaca, N.Y.). The soil consisted of 36% sand, 54% silt, and 10% clay. It contained 2.94% organic carbon and had a pH of 5.9 in water (1:1). Coal tar-contaminated soil was collected from a former manufactured gas plant site in New Jersey. The soil was classified as loamy sand, consisting of 78% sand, 11% silt, and 11% clay.

Seven PAHs, including naphthalene (NAP), fluorene (FLU), phenanthrene (PHE), anthracene (ANT), pyrene (PYR), chrysene (CHR), benzo(a)pyrene (BaP), and also radiolabeled [7-$^{14}C$]BaP (specific activity, 26.6 mCi/mmol; purity, >95%) were used for this study. All chemicals were purchased from Sigma Chemical Company. Ten milliliters of stock solution were made in a 20-mL amber vial with a Teflon-lined cap by dissolving 10 mg each of NAP, FLU, PHE, ANT, and PYR and 5 mg each of CHR and BaP in 1 mL of dichloromethane. For artificial contamination of PAHs, 10 g of Quakertown silt loam were placed in a 125-mL flask (or a 100-mL glass bottle) and spiked with 100 µL of the stock solution. The solvent was allowed to evaporate in a fume hood for an hour with mixing the soil in 15-min intervals. This gave a total PAHs concentration of 600 µg per gram of soil. The physical and chemical properties of the PAHs used for this study are presented in Table 1.

TABLE 1

Physical and Chemical Properties[a] of PAHs Used and Concentrations of PAHs in a Former MGP Soil

| PAHs | Number of Rings | Solubility in water (mg/L)[b] | Log $K_{ow}$[c] | Vapor Pressure (at 20° C.) | Initial conc. (mg/Kg soil)[d] | Relative Abundance (%) |
|---|---|---|---|---|---|---|
| Naphthalene | 2 | 32 | 3.37 | $4.9 \times 10^{-2}$ | 1205 (101) | 32.4 |
| fluorene | 3 | 1.9 | 4.18 | $1.3 \times 10^{-2}$ | 252 (31) | 6.8 |
| phenanthrene | 3 | 1.0 | 4.46 | $6.8 \times 10^{-4}$ | 921 (89) | 24.7 |
| anthracene | 3 | 0.07 | 4.45 | $1.9 \times 10^{-4}$ | na[e] | na |
| pyrene | 4 | 0.16 | 5.32 | $6.8 \times 10^{-7}$ | 524 (36) | 14.1 |
| chrysene | 4 | 0.006 | 5.61 | $6.3 \times 10^{-7}$ | 454 (62) | 12.2 |
| benzo(a)pyrene | 5 | 0.0038 | 6.04 | $5.0 \times 10^{-7}$ | 366 (59) | 9.8 |

[a]Data from Sims, R. C. and Overcash, M. R. Residues Rev (1983) 88: 1–68; and Lee, L. S., Roa, P. S. C. and Okuda, I. Environ. Sci. technol. (1992) 26: 2110–2115.
[b]Crystal solubility at 25° C.
[c]Logarithm of the octanol: water partition coefficient.
[d]Values are the means of nine replicate determinations (standard deviations).
[e]Not assayable.

The microbial Consortium utilized in the following examples was cultured from coal tar-contaminated soil. The following enrichment culture technique was used to isolate PAH-degrading organisms as a consortium: Two- to five-gram samples of MGP soil collected from the depth of 0–2 m below surface were incubated with a mixture of PAHs in 100 mL of inorganic salts solution (0.10 g $CaCl_2.2H_2O$, 0.01 g $FeCl_3$, 0.10 g $MgSO_4.7H_2O$, 0.10 g $NH_4NO_3$, 0.20 g $KH_2PO_4$, and 0.80 g $K_2HPO_4$/L of $dH_2O$; pH 7.0) at 30° C. for two weeks. PAHs including PHE, ANT, PYR, CHR, and BaP were dissolved in methanol (10 mg/mL for the first three compounds and 1 mg/mL for the others), and the PAHs-methanol solution was used as substrates for the enrichment. After two weeks of incubation, 10 mL of the supernatant were collected and incubated for two more weeks as described above. By this procedure, a consortium capable of degrading a variety of PAHs was obtained and used for biodegradation experiments. The consortium was maintained in 50 mL of inorganic salts solution containing 50 mg of phenanthrene as a sole carbon source. After 5 days of incubation at 30° C. with shaking (200 rpm), the culture was centrifuged at 7600×g for 10 min. The cells were washed twice with the inorganic salts solution and an inoculum of more than $10^8$ cells was used for biodegradation. The number of viable cells was determined by plate counting on Trypticase Soy Agar (TSA).

In this way, the particular species in the consortium that flourished in the medium were represented by a much higher population number after two weeks of growth on the contaminant mixture expected in the particular application. This mixture was thereafter saved and frozen for further use later.

A transition metal is needed to react with the peroxide to free a reactive free radical. The transition metals include manganese, iron, cobalt, nickel, copper and zinc. Iron is the preferred transition metal for practicing the present invention. Of particular interest is $FeSO_4$, or Fenton's reagent.

Fenton's reagent was generated by mixing hydrogen peroxide (30%, w/v) with $FeSO_4.7H_2O$ in varying ratios to determine the optimum conditions for the degradation of PAHs. The sequence of reagent addition seemed to be important to ensure that the reaction occurred efficiently, as well as to ensure that the reaction could be safely maintained. Desired amounts of ferrous sulfate were added to 10 g of PAHs-spiked soil or 5 g of MGP soil in 20 mL of distilled water containing 0.02% $HgCl_2$. To the soil slurry, hydrogen peroxide was introduced gradually by pipetting (ca. 0.3 g each with 10-min intervals), and the reaction was allowed to occur for 24 h on an orbital platform shaker at room temperature. Preliminary experiments showed that stepwise addition of hydrogen peroxide was more effective compared to bulk-type addition in batches. For the Fenton-type reaction at near neutral pH, a modified Fenton's reagent was developed by using a chelating agent (i.e., catechol or gallic acid) and $Fe(ClO_4)_3.6H_2O$. Two grams of hydrogen peroxide and 323 mg of $Fe(ClO_4)_3.6H_2O$ (0.07 M) were used for the reaction. The molar concentration of chelating agent was the same as that of $Fe^{3+}$; 82.5 mg of catechol or 141.0 mg of gallic acid was used. Before the addition of ferric ions and hydrogen peroxide, an appropriate chelator was added to the soil slurry and 1 g of calcium carbonate was also applied to maintain the pH of the system at about 6.0 to 6.5 throughout the reaction.

When Fenton-type reaction was combined with biodegradation, inorganic salts solution (pH 7.0) instead of distilled water was used to promote microbial degradation. An active microbial consortium described above was used for biodegradation. Biodegradation was performed for four weeks at room temperature on a rotary shaker.

Extraction and Determination of PAHs. The soil slurry used for either biodegradation or Fenton-type reaction, or both, was transferred to a 50-mL Teflon centrifuge tube and centrifuged at 18,600×g for 15 min. After removing the supernatant, 10 mL each of dichloromethane and acetone were added to the soil and the soil-solvent suspension was shaken (200 rpm) for 48 h at 30° C. for the extraction of PAHs. The tube was then centrifuged at 18,600×g for 15 min and the solvent mixture was transferred to a 50-mL test tube. After removing excess water (upper layer; ca. 2 mL) by pipetting, 4 g of anhydrous sodium sulfate were mixed with the PAHs-containing solvent to remove residual water completely from solvent. The concentration of PAHs in the water layer was less than the detection limit of the analytical procedure used in this study. The extract was then concentrated to 1 to 2 mL using an evaporator (Büchi Rotavapor;

Buchler Instruments Inc., Fort Lee, N.J.) for further analysis. By this procedure, 100% of the PAHs freshly spiked to Quakertown silt loam were recovered.

The extract was passed through a 0.45-μm PTFE syringe filter to remove any particulates present and analyzed by a gas chromatograph (GC) equipped with a flame ionization detector (Varian Star 3500; Varian Chromatograph Systems, Walnut, Calif.). The GC was installed with a Rtx-5 silica column crossbonded with 5% diphenyl and 95% dimethylpolysiloxane (30 m×0.53 mm inner diameter; Restek Corporation, Bellefonte, Pa.). The oven temperature was programmed at 40° C. for 6 min, followed by a linear increase of 10° C. per minute to 300° C., and then the temperature was held for 15 min. Injector and detector temperatures were maintained at 300° C. Two microliters of the extract were injected and nitrogen was used as a carrier gas.

Data Analysis. Precautions were taken to correct for differences in extractability and volatilization of PAHs that occurred during the four-week biodegradation experiment. Since the extractability of organic compounds decreases as the residence of the compounds in soil increases (15) we have determined the time dependency of the efficiency of the extraction method used for this study with PAHs-spiked soil samples. A decreased extractability was observed, especially with CHR and BaP. To correct for this, separate sets of soil samples spiked with PAHs were made in parallel with soil samples for treatments, and run as controls during the incubation period of each treatment. In MGP soils, it was assumed that extractability of PAHs did not decrease during the period of treatment because the PAHs in the soils had been present for over 100 years. Instead, concentrations of PAHs were not uniform in MGP soils, which would influence the efficiency of chemical and biological treatments. Thus, the soil samples were mixed thoroughly each time when they were used, and separate sets of samples were also run as control. Values presented in the tables represent the percentages of the amounts of PAHs recovered from each control of corresponding incubation period.

Comparative Example 1

Biodegradation of PAHs by a Microbial Consortium. The ability of a highly active consortium that had been obtained from the MGP to degrade PAHs was tested by spiking a mixture of PAHs into a model soil. The PAHs ranged from two- to five-ring compounds and were freshly spiked to Quakertown silt loam for biodegradation. As shown in Table 2, this consortium immediately degraded two-ring compounds and PHE. More than 94% of ANT also disappeared in two weeks of biodegradation. PYR and CHR showed slower degradation, but eventually more than 95% were degraded. Noticeably, this consortium was capable of degrading more than 70% of Benzo(a)pyrene in the model soil.

TABLE 2

Biodegradation of Polyacyclic Aromatic Hydrocarbons (PAHs) Freshly Added to Quakertown Silt Loam by a Microbial Consortium

| | % of control remaining in soil[a] | | | |
|---|---|---|---|---|
| PAHS | 1 week | 2 weeks | 3 weeks | 4 weeks |
| Naphthalene | nd[b] | Nd | nd | nd |
| Fluorene | 4.6a | 2.2b | 1.7b | 1.5b |
| Phenanthrene | Nd | 2.7a | 1.6ab | 1.2b |

TABLE 2-continued

Biodegradation of Polyacyclic Aromatic Hydrocarbons (PAHs) Freshly Added to Quakertown Silt Loam by a Microbial Consortium

| | % of control remaining in soil[a] | | | |
|---|---|---|---|---|
| PAHS | 1 week | 2 weeks | 3 weeks | 4 weeks |
| Anthracene | 23.3a | 5.5b | 3.4bc | 2.5c |
| Pyrene | 62.4a | 9.9b | 5.6c | 4.8c |
| Chrysene | 97.7a | 28.2b | 10.2c | 7.4c |
| Benzo(a)pyrene | 94.2a | 59.5b | 31.6c | 27.4c |

[a]Values are the means of triplicate determinations. Values in a row followed by the same letter are not significantly different (p < 0.05).
[b]Not detected.

Comparative Example 2

Fenton's Reagent Treatment. To obtain an optimum condition for Fenton reaction in the transformation of freshly added PAHs, hydrogen peroxide oxidation was performed in the presence of ferrous sulfate with varying ratios of peroxide to ferrous ions in the model soil (Table 3). At the ratio of 1:1 ($[H_2O_2:FeSO_4]=[0.2\ g:0.2\ g]$), oxidation of PAHs was not efficient except for NAP, which was reduced to 35% of the initial amount. Increasing the amount of hydrogen peroxide enhanced the oxidation efficiency. At the ratio of 10:1 ($[H_2O_2:FeSO_4]=[2.0\ g:0.2\ g]$), a large amount of the PAHs was destroyed by a 24-h oxidation. Amounts of NAP, FLU, and PHE were reduced by 90 to 100% and PYR, a four-ring compound, was also readily destroyed. However, ANT and CHR showed some degree of resistance to the hydrogen peroxide treatment since only about 40 and 12%, respectively, was degraded by the same treatment. Unexpectedly, the very recalcitrant hydrocarbon Benzo(a) pyrene was one of the most sensitive hydrocarbons to the oxidation and only 3.3% remained in the model soil.

татко TABLE 3

Effect of Fenton Reaction on the Degradation of PAHs by Varying Ratios of Hydrogen Peroxide to Ferrous Sulfate in Quakertown Silt Loam[a]

| | % remaining in soil | | | |
|---|---|---|---|---|
| PAHs | 1:1[b] | 5:1[c] | 10:1[d] | 10:1[e] |
| Naphthalene | 35.2a | nd[f] | <9.3b[g] | nd |
| Fluorene | 76.5a | 44.5b | 11.0c | 18.8d |
| Phenanthrene | 83.7a | 48.2b | nd | nd |
| Anthracene | 100a | 75.9b | 61.9c | 79.3b |
| Pyrene | 95.4a | 51.0b | 15.5c | 26.3d |
| Chrysene | 100a | 87.0b | 88.1b | 98.2c |
| Benzo(a)pyrene | 84.8a | 35.3b | 3.3c | 60.9d |

[a]Values are the means of five replicate determinations. Values in a row followed by the same letter are not significantly different (<0.05).
[b]$[H_2O_2:FeSO_4] = [0.2\ g:0.2\ g]$
[c]$[H_2O_2:FeSO_4] = [1.0\ g:0.2\ g]$
[d]$[H_2O_2:FeSO_4] = [2.0\ g:0.2\ g]$
[e]$[H_2O_2:FeSO_4] = [1.0\ g:0.1\ g]$
[f]Not detected.
[g]Detected from only one sample.

Since the ratio of 10:1 was shown to be the most effective in the degradation of PAHs, the amounts of hydrogen peroxide and ferrous ions were changed while maintaining the same ratio. When 1 g of hydrogen peroxide and 100 mg of ferrous sulfate were used, the degradation efficiency for NAP, FLU, and PHE was not significantly altered compared to when 2 g and 200 mg of each reagent was used. However, PAHs including ANT, PYR, CHR, and BaP were degraded to a significantly lesser extent (Table 3). In one experiment, the reaction (2 g $H_2O_2$ and 200 mg $FeSO_4$) was extended to 3 days to see if further degradation was evident, but no additional benefit was obtained.

The amount of ferrous sulfate was changed while maintaining the amount of hydrogen peroxide constant (2 g). As shown in Table 4, the efficiency of PAHs degradation greatly decreased when ferrous ions were not added to the reaction. Even with the most susceptible hydrocarbon NAP, more than 56% of the initial amount remained in the model soil. When 100 mg of ferrous sulfate was added, the efficiency was almost the same as with the reaction with 200 mg of ferrous sulfate except for ANT and BaP. Degradation of hydrocarbons was significantly enhanced by the addition of 200 mg of ferrous sulfate.

TABLE 4

Effect of Fenton Reaction on the Degradation of PAHs in the Presence of Hydrogen Peroxide (2g) and Various Amounts of Ferrous Sulfate in Quakertown Silt Loam[a]

| PAHs | % remaining in soil | | |
|---|---|---|---|
| | No $FeSO_4$ | 100 mg | 200 mg[b] |
| Naphthalene | 56.1a | nd[c] | <9.3b |
| Fluorene | 88.7a | 19.8b | 11.0c |
| Phenanthrene | 88.3 | Nd | nd |
| Anthracene | 92.7a | 76.3b | 61.9c |
| Pyrene | 88.3a | 16.3b | 15.5c |
| Chrysene | 77.0ab | 72.6a | 88.1b |
| benzo(a)pyrene | 73.2a | 10.5b | 3.3c |

[a]Values are the means of five replicate determinations. Values in a row followed by the same letter are not significantly different (p < 0.05).
[b]Data from TABLE 3.
[c]Not detected.

Comparative Example 3

Biodegradation vs. Fenton Reaction in MGP Soil. The biodegrading activity of the consortium was also determined in an MGP soil that was heavily contaminated with PAHs. Initial concentrations of PAHs were determined by using dichloromethane and acetone as extraction solvents (Table 1). The soil contained 63.9% of easily biodegradable PAHs (i.e., NAP, FLU, and PHE) and 36.1% of four- and five-ring hydrocarbons. A peak corresponding to ANT was not clearly separable and sometimes overlapped with a PHE peak on the GC chromatogram, hence ANT was not included in this analysis.

Fenton reaction in the ratio of 10:1 ($[H_2O_2:FeSO_4]=[2.0$ g:0.2 g]) was used to investigate degradation of PAHs in MGP soil. For NAP, FLU, and PHE, 80 to 99% of the initial amount was removed, but only 20 to 40% was degraded for higher molecular weight PAHs such as PYR, CHR, and BaP (Table 5). The degradation efficiency of PAHs was even higher by biodegradation. NAP disappeared completely during the four-week biodegradation treatment and about 90 and 84% of FLU and PHE were degraded, respectively. Amounts of four- and five-ring hydrocarbons were reduced by about 35 to 50% (Table 5). When compared to the model soil, PAHs degradation by either biodegradation or Fenton reaction was not as efficient in MGP soil, especially for PYR, CHR, and BaP, probably due to heavy contamination of the soil.

TABLE 5

Efficacy of Fenton Reaction and Biodegradation in the Removal of PAHs in MGP Soil

| PAHs | % remaining in soil[a] | |
|---|---|---|
| | Bio[b] | FR[c] |
| Naphthalene | <1.11 | nd |
| Fluorene | 15.6a | 10.3a |
| Phenanthrene | 20.0a | 16.8a |
| Pyrene | 59.8a | 53.4a |
| Chrysene | 77.2a | 50.8b |
| benzo(a)pyrene | 79.5 | 64.9 |

[a]Values are the means of five replicate determinations. Values in a row followed by the same letter are not significantly different (p < 0.05).
[b]Biodegradation for four weeks at room temperature.
[c]Fenton's reagent treatment for 24 hours.

Fate of Benzo(a)pyrene during Fenton Reaction. It is theoretically possible that Fenton's reagent could completely transform organic compounds to carbon dioxide ("mineralization"). However, little attempt has been made to quantify how much of the parent compounds are mineralized in a typical Fenton reaction. For this test, Benzo(a)pyrene was chosen as a model hydrocarbon, and the distribution of Benzo(a)pyrene during the Fenton reaction was monitored by using $^{14}C$-labeled compound and gas chromatography (Table 6). Results showed that only 3.3% of the initial amount was recovered as the parent compound. Of the remaining, 18.3% was detected as carbon dioxide, and an additional 16.8 and 31.3% was detected as intermediates from aqueous phase and soil extract, respectively. The remaining 33.6% of the initial Benzo(a)pyrene was not extractable by the solvent extraction used for this study. This portion may represent either oxidized intermediates covalently bound to soil organic matter or parent compounds sequestered in the soil matrix, or both.

TABLE 6

Fate of Benzo(a)pyrene During the Treatment of Fenton's Reagent in Quakertown Silt Loam[a]

| | % recovered |
|---|---|
| parent compound[b] | 3.3 |
| Mineralization to $CO_2$ | 18.3 |
| Intermediates | |
| Water soluble | 16.8 |
| $CH_2Cl_2$ extractable | 31.3 |
| Nonextractable (calculated)[c] | 30.3 |
| Total | 100 |

[a]$[H_2O_2:FeSO_4] = [2.0$ g:0.2 g]
[b]Determined by GC/FID
[c]This fraction may include intermediates incorporated into soil organic matter and parent compounds strongly sorbed to soil.

In order to inhibit the reaction of the transition metal with the peroxide, maintain a moderate pH, and in order to solubilize the transition metal, a weak complexer or chelator is utilized. The complexer is desirably biodegradable. The complexer must be chosen so it is not too strong a chelator to prevent the transition metal to participate in free radical generation, i.e. it must be sufficiently weak to release the metal for its function. The complexing agent weakly coordinates with the transition metal to provide aqueous solubility. Preferably an hydroxylated benzene such as catechol or gallic acid is used. These compounds are naturally occurring in soil and do not add to the contamination, nor detract from the biocompatibility of the treatment.

Example 5

Modified Fenton's Reagent. In an attempt to remove more PAHs from the MGP soil, biodegradation in conjunction with Fenton-type oxidation would appear to be a viable option. However, the extremely low pH requirement (optimum pH ca. 2–3) for the Fenton reaction makes the process incompatible with biological treatment. In addition, this low pH may increase mobilization of heavy metal co-contaminants, and would devastate the soil ecosystem where the reagent is used. In order to overcome these limitations, two approaches were used. In the first approach, the pH of the system was adjusted to approximately 6 by addition of alkali (i.e., NaOH), buffer solutions (i.e., potassium phosphate buffer, phosphate-buffered saline), or calcium carbonate. However, this approach failed to produce the desired result. Either the pH of the system dropped to pH 2 (for alkali and buffer solutions) or the efficiency of the reaction decreased greatly (for calcium carbonate; second column in Table 7). As a second approach, the Fenton's chemistry was modified by the use of chelating agents such as catechol or gallic acid, and by the use of ferric ions instead of ferrous ions. Calcium carbonate was used to maintain the pH of the system around 6 to 6.5 throughout the reaction. Fifteen potential chelators including di- and trihydroxybenzenes, di- and trihydroxybenzoic acids, gallic acid, nitrilotriacetic acid, diethylenetriaminepentaacetate, and salicylic acid were tested to identify an appropriate chelator. Among them, catechol and gallic acid were chosen based on their performance with regard to the degradation efficiency of PAHs. Destruction efficiency was similar between catechol and gallic acid and use of this modified Fenton's reagent allowed for destruction of PAHs (Table 7). As found for the unmodified Fenton reaction, PYR and BaP were more sensitive to the hydrogen peroxide oxidation than ANT and CHR. On the whole, the modified Fenton's reagent resulted in a decline in overall performance relative to the unmodified Fenton's reagent, but the pH was maintained at about 6 to 6.5, which allowed for the combined treatment with biodegradation (Table 7).

TABLE 7

Degration of PAHs by Hydrogen Peroxide Oxidation at Near Neutral pH (ca. 6.0–6.5) in Quakertown Silt Loam

| | % remaining in soil[a] | | |
|---|---|---|---|
| | FR[b] + | mFR[c] | |
| PAHs | $CaCO_3$ | + catechol | + gallic acid |
| Naphthalene | 16.1a | 15.3a | 11.1a |
| Fluorene | 72.5a | 67.2ab | 63.8b |
| Phenanthrene | 82.0a | 68.3b | 70.1b |
| Anthracene | 78.1a | 70.8ab | 66.8b |
| Pyrene | 77.1a | 58.3b | 58.9b |
| Chrysene | 100a | 100a | 91.1b |
| banezo(a)pyrene | 73.1a | 54.8b | 49.6b |

[a]Values in columns are the means of five replicate determinations. Values in a row followed by the same letter are not significantly different (p < 0.05).
[b]FR stands for Fenton's reagent.
[c]mFR stands for modified Fenton's reagent.

Example 6

Biodegradation Combined with Modified Fenton's Reagent. The modified Fenton's reagent has been tested in combination with biological treatment using the PAH-degrading microbial consortium described above. Two possible treatment sequences were tested: modified Fenton's reagent followed by biodegradation and biodegradation followed by Fenton's treatment. The results in Table 8 show that the sequence in which the combined treatment was carried out had a pronounced effect on the outcome. Biodegradation followed by modified Fenton's treatment was superior to the reverse-order sequence in the degradation of PAHs in MGP soil. In both sequences, NAP was degraded almost completely. When modified Fenton's reagent was followed by biodegradation, about 31 to 39% of FLU and PHE were recovered from the MGP soil and about 62 to 86% of PYR, CHR, and BaP remained in the soil. However, between 85 and 98% of initial NAP, FLU, PHE and PYR were removed from the soil by the reverse-order sequence, using catechol as the ligand (Table 8). In general, catechol was a slightly better chelator than gallic acid. The results show that there are distinct advantages to using a modified form of Fenton's reagent in combination with biodegradation for the remediation of PAHs-contaminated soil.

TABLE 8

Combined Effect of Modified Fenton's Reagent and Biodegradation on the Degradation of Aged PAHs in a MGP Soil

| | % remaining in soil after treatment[a] | | | |
|---|---|---|---|---|
| | MFR→Bio[b] | | Bio→mFR | |
| PAHs | Catechol | gallic acid | catechol | gallic acid |
| Naphthalene | 5.88a | 5.67a | nd[c] | nd |
| Fluorene | 31.4a | 34.5a | 1.37b | 2.53b |
| Phenanthrene | 33.1a | 38.9a | 1.23b | 1.39b |
| Pyrene | 62.2a | 74.8b | 14.2c | 24.6d |
| Chrysene | 85.9a | 81.7a | 34.2b | 48.7c |
| banezo(a)pyrene | 74.1a | 75.5a | 32.3b | 44.1c |

[a]Values are the means of five replicate determinations. Values in a row followed by the same letter are not significantly different (p < 0.05).
[b]mFR: modified Fenton's reagent and biodegradation was performed for four weeks at room temperature.
[c]Not detected.

The original Fenton's reagent ($H_2O_2$+$FeSO_4$) reduced significant amounts of total PAHs, and especially BaP, in a model soil. However, efficiency declined greatly when used in an MGP soil. This might have resulted from the heavy contamination of PAHs, and co-contamination by other types of hydrocarbons (e.g., aliphatics), in the MGP soil. By GC analysis, more than 100 peaks were identified in solvent extracts of the MGP soil. Due to the nonspecificity of hydroxyl radicals, it is likely that the radicals generated were scavenged by other organic compounds present in the MGP soil as well as by the PAHs. In addition, natural organic matter can be another sink for hydroxyl radicals in soil. Soil organic matter can reduce the efficacy of Fenton-type reaction by competing with contaminants for hydroxyl radicals or by catalyzing hydrogen peroxide decomposition (Pignatello, J. J., Chapa, G. 1994. Degradation of PCBs by ferric ion, hydrogen peroxide and UV light. Environ. Toxicol. Chem. 13 (3), 423–327; Ronen, Z., Morrath-Gordon, M., Bollag, J. M. 1994. Biological and chemical mineralization of pyridine. Environ. Toxicol. Chem. 13 (1), 21–26). This suggests that results from simple systems (e.g., Fenton-type oxidation in organic-free water) may not be directly useful for predicting the degradation of contaminants present in matrices that also contain natural organic matter.

The ratio of hydrogen peroxide to ferrous ions is known to be an important determinant in the efficacy of the Fenton oxidation. Pratap and Lemley (Pratap, K., Lemley, A. T. 1998. Fenton electrochemical treatment ofaqueous atrazine and metolachlor. J. Agric. Food Chem. 46 (8), 385–3291)

reported that a ratio of 5:1 was the most efficient in degradation of atrazine and metolachlor while Arnold et al. (Arnold, S. M., Hickey, W. J., Harris, R. H. 1995. Degradation of atrazine by Fenton's reagent: condition optimization and product quantification. Environ. Sci. Technol. 29 (8), 2083–2089) observed complete degradation of atrazine at a ratio of 1:1. In addition, Tyre et al. (Tyre, B. W., Watts, R. J., Miller, G. C. 1991. Treatment of four biorefractory contaminants in soils using catalyzed hydrogen peroxide. *J. Environ. Qual.* 20 (4), 832–838) observed that the highest degradation efficiency of pentachlorophenol and dieldrin occurred without addition of exogenous iron, for soils that contained iron minerals. In our system, a 10:1 ratio allowed for the greatest degradation of PAHs. The need for the higher ratio in our system may be due to types and concentrations of contaminants, characteristics and content of soil organic matter, or soil mineralogy.

Our results showed that biodegradation of low molecular weight PAHs was faster and more extensive than that of high molecular weight hydrocarbons. However, this is not consistent with the degradation pattern obtained using Fenton's reaction. Despite the general consensus that hydroxyl radicals are nonspecific oxidants, PYR and BaP seemed to be very susceptible and ANT and CHR were shown to be resistant to Fenton-type oxidation in a model soil. BaP is known to be very recalcitrant to microbial degradation and thus persistent in the environment. In this regard, the finding that BaP is readily destroyed by hydroxyl radicals is noteworthy although the mechanism(s) by which thus occurs can not be explained from our experiments. By using the Fenton-type oxidation, it seems to be possible to bring about a nearly complete transformation of hydrocarbons that are only slightly biodegradable such as Benzo(a)pyrene.

The fact that the optimum pH for a conventional Fenton reaction is pH 2 to 3 poses great concerns ecologically. First, low pH itself can result in significant environmental perturbation and second, low pH can enhance the solubility of heavy metal ions that may be present as co-contaminants. The efficiency of the Fenton reaction greatly decreases with increasing pH (Arnold, S. M., Hickey, W. J., Harris, R. H. 1995. Degradation of atrazine by Fenton's reagent: condition optimization and product quantification. *Environ. Sci. Technol.* 29 (8), 2083–2089) because the solubility of ferric ions (converted from ferrous ions by hydroxyl radicals) declines at higher pH (i.e., above pH 3). The decline in reactivity is due to precipitation of ferric ions as an oxyhydroxide complex (Bohn, H. L., McNeal, B. L., O'Conner, G. A. 1985. In: Soil Chemistry. John Wiley & Sons, New York. pp. 21–65). However, a Fenton-type reaction can occur at near-neutral pH by stabilizing the solubility of ferric ions with chelating agents (Sun, Y., Pignatello, J. J. 1992. Chemical treatment of pesticide wastes. Evaluation of Fe(III) chelates for catalytic hydrogen peroxide oxidation of 2,4-D at circumneutral pH. *J. Agric. Food Chem.* 40 (2),322–327; Sun,Y., Pignatello, J. J. 1993. Activation of hydrogen peroxide by iron (III) chelates for abiotic degradation of herbicides and insecticides in water. *J. Agric. Food Chem.* 41 (2), 308–312; Pignatello, J. J., Baehr, K. 1994. Ferric complexes as catalysts for "Fenton" degradation of 2,4-D and metolachlor in soil. *J. Environ. Qual.* 23 (2), 365–370). Among the chelators tested during this study, catechol and gallic acid resulted in the most efficient degradation of PAHs in a model soil. Since both catechol and gallic acid are natural products and are readily degraded by microorganisms, their use as chelators is not likely to pose an environmental concern. It should be noted that the pH of the system remained above 6 during the reaction using either catechol or gallic acid. Although this modified form of the Fenton reaction was not as efficient as the original version, the modification has the great advantage of being directly compatible with biodegradation processes.

The primary objective of the present study was to determine whether a biologically compatible Fenton oxidation, in combination with biotreatment, could achieve maximum degradation of contaminants in soil. Integration of chemical oxidation with biodegradation can be performed in two ways. Oxidation can be applied to precondition organic contaminants for biodegradation or be used as a polishing step to remove residual contaminants (Brown, R. A., Nelson, C., Leahy, M. 1997. Combined oxidation and bioremediation for the treatment of recalcitrant organics. In: B. C. Alleman and A. Leeson (Eds.). In Situ and On-site Bioremediation. Battelle Press, Columbus, Ohio, pp. 457–462). Our results showed that biodegradation followed by a modified Fenton reaction was more efficient than the reverse-order sequence. These results suggest that easily biodegradable PAHs (i.e., two- and three-ring compounds) were removed by biodegradation, and then, the modified Fenton's reagent appeared to target the more recalcitrant four- and five-ring PAHs. When a soil is dominated by four-ring to six-ring PAHs, chemical oxidation is best performed as a pretreatment step, and when two- and three-ring hydrocarbons are abundant, biodegradation is recommended as the initial step to reduce excessive biodegradable hydrocarbons (Srivastava, V. J, Kelley, R. L., Paterek, J. R., Hayes, T. D., Nelson, G. L., Golchin, J. 1994. A field-scale demonstration of a novel bioremediation process for MGP sites. *J. Appl. Biochem. Biotechnol.* 45/46, 741–756). Indeed, in our MGP soil the concentration of two- and three-ring hydrocarbons was about twice that of four- and five-ring PAHs (Table 1).

Most studies conducted to date in application of a Fenton-type process have focused on direct destruction of contaminants in soil, however, due to the low pH requirement of the reaction for optimum efficiency, there is cause for ecological concern. In the present study, we have developed a modified form of Fenton's reagent in an attempt to combine a Fenton-type reaction with biodegradation. Hydroxyl radical has over twice the oxidation potential of chlorine and is 25% stronger than ozone. In this study, biodegradation in conjunction with the powerful oxidation potential of hydroxyl radicals was shown to enhance the degradation of highly hydrophobic PAHs and to be more advantageous in destroying a mixture of PAHs than either treatment alone. In addition, the reagents used are inexpensive and the reactions are rapid and simple. Furthermore, use of a chelating agent eliminates the concern of an acidified soil environment which is associated with the original Fenton reaction. Our data demonstrate that combined biodegradation and a modified Fenton-type reaction is a promising technology to remediate soils heavily contaminated with mixtures of PAHs.

The present invention will be of immediate relevance and applicability to the gas and electric utility industries and owners of former MGP sites with soils contaminated with coal tar residues. The technology could also be applicable to wood treatment sites contaminated with creosotes, to coke plant sites, to gas works sites contaminated with gas condensate residues, and to petroleum refineries and petroleum storage facilities (such as tank farms) that have been contaminated with heavy oil fractions. The combined chemical and biological treatment process being investigated here could also be applied to treatment of media contaminated by other highly hydrophobic compounds, such as sediments contaminated with PCBs, chlorinated dioxins and dibenzofurans, or soils contaminated with DNAPLs such as chlorinated solvents.

What is claimed is:

1. A method of treatment of a contaminate contaminated with an organic compound, comprising the steps of:
   (a) providing a contaminate, wherein the contaminate is contaminated with an organic compound;
   (b) treating the contaminate with a chemical oxidation step, wherein the chemical oxidation step comprises: contacting the contaminate with a transition metal in soluble form; and an isolated chelator of the transition metal, wherein the chelator of the transition metal and the transition metal form a transition metal:chelator complex; and an oxidizing agent that provides a reactive free radical in the presence of the transition metal:chelator complex; and a buffering salt; wherein the pH is maintained in the neutral range; and wherein the reactive free radical initiates a chemical reaction with the organic compound to produce reaction products of the organic compound; and
   (c) treating the contaminate with a bioremediation step, wherein the bioremediation step comprises contacting the contaminate with living, exogenous microbial consortium including at least two species under conditions suitable for the microbial consortium to mediate solubilization or biodegradation of the organic compound or the reaction products thereof.

2. The method of treatment according to claim 1, further comprising pre-treating the contaminate with the microbial consortium prior to the chemical oxidation step.

3. The method of treatment according to claim 1, further comprising treating with the microbial consortium alter the chemical oxidation step.

4. A method of treatment according to claim 1, wherein the contaminate is a particulate material, a surface soil, a subsurface soil, a sand, a silt a clay, a sediment, a loam, a slurry, a colloid, a liquor, an industrial water fluid, ground water, a pool, a pond or a lake.

5. The method of treatment according to claim 4, wherein the particulate material is gravel, pebbles, stone, stone chips, rock, ore, mining waste, coal, coke, slag, concrete, brick, construction material, demolition material, vermiculite, synthetic resin or plastic.

6. The method of treatment according to claim 1, wherein the contaminating organic compound is selected from the group consisting of a polycyclic compound, an aromatic compound, a polycyclic aromatic compound, an aliphatic compound, an olefinic compound and an ethynic compound.

7. The method of treatment according to claim 6, wherein the contaminating organic compound is a polycyclic aromatic compound.

8. The method of treatment according to claim 7, wherein the polycyclic aromatic compound is selected from the group consisting of naphthalene, fluorene, phenanthrene, anthracene, pyrene, chrysene and benzo(a)pyrene.

9. The method of treatment according to claim 1, wherein the transition metal is manganese, iron, cobalt, nickel, copper or zinc.

10. The method of treatment according to claim 9, wherein the transition metal is iron.

11. The method of treatment according to claim 10, wherein the iron is present as ferrous iron, Fe(II), or ferric iron, Fe(III).

12. The method of treatment according to claim 11, wherein the iron is present as a perhalate.

13. The method of treatment according to claim 12, wherein the perhalate is a perchiorate, a perbromate or a periodate.

14. The method of treatment according to claim 13, wherein the perhalate is a perchlorate.

15. The method of treatment according to claim 1, wherein the chelator of the transition metal is an iron-chelator compound.

16. The method of treatment according to claim 15, wherein the iron-chelator compound is a hydroxylated benzene, a hydroxylated benzoic acid, a nitrilotriacetic acid, or a diethylenetriaminepentaacetic acid.

17. The method of treatment according to claim 16, wherein the hydroxylated benzene is a dihydroxybenzene or a trihydroxybenzene.

18. The method of treatment according to claim 17, wherein the hydroxylated benzene is a dihydroxybenzene.

19. The method of treatment according to claim 18, wherein the dihydroxybenzene is catechol.

20. The method of treatment according to claim 16, wherein the hydroxylated benzoic acid is gallic acid.

21. The method of treatment according to claim 16, wherein the hydroxylated benzoic acid is salicylic acid.

22. The method of treatment according to claim 1, wherein the pH is maintained in the range from about pH 5 to about pH 8.

23. The method of treatment according to claim 22, wherein the pH is maintained in the range from about pH 5.5 to about pH 7.

24. The method of treatment according to claim 23, wherein the pH is maintained in the range from about pH 6 to about pH 6.5.

25. The method of treatment according to claim 1, wherein the oxidizing agent is a peroxide.

26. The method of treatment according to claim 25, wherein the peroxide is hydrogen peroxide.

27. The method of treatment according to claim 1, wherein the reactive free radical comprises an oxygen radical.

28. The method of treatment according to claim 1, wherein the organic compound of the contaminate is insoluble in aqueous solution.

29. The method of treatment according to claim 1, wherein the reaction products are soluble in aqueous solution.

30. The method of treatment according to claim 1, wherein at least one of the reaction products of the organic compound is bioavailable tote microbial consortium.

31. The method of treatment according to claim 1, wherein the oxidizing agent produces an oxygen radical.

32. The method of treatment according to claim 1, wherein the buffering salt is a salt with a pKa in the neutral range.

33. The method of treatment according to claim 32, wherein the buffering salt is a salt with a pKa in the range from about 5 to about 8.

34. The method of treatment according to claim 33, wherein the buffering salt is calcium carbonate.

35. The method of treatment according to claim 1, wherein the molecular weight of the organic compound of the contaminate is reduced.

36. The method of treatment according to claim 35, wherein the organic compound of the contaminate is substantially mineralized to carbon dioxide and water.

37. The method of treatment according to claim 1, wherein the organic compound of the contaminate is toxic or carcinogenic to animals.

38. The method of treatment according to claim 37, wherein the organic compound of the contaminate is toxic or carcinogenic to humans.

39. The method of treatment according to claim 1, wherein the reaction products are non-toxic to animals.

40. The method of treatment according to claim 39, wherein the reaction products are non-toxic to humans.

41. The method of treatment according to claim 1, wherein treating with the microbial consortium yields at least one biodegradation reaction product, and wherein the products of biodegradation ore non-toxic to animals.

42. The method of treatment according to claim 41, wherein the products of biodegradation are non-toxic to humans.

43. The method of treatment according to claim 41, wherein the biodegradation products are not known to be carcinogenic in animals.

44. The method of treatment according to claim 43, wherein the biodegradation products are not known to be carcinogenic in humans.

45. The method of treatment according to claim 1, wherein the reaction products are not known to be carcinogenic in animals.

46. The method of treatment according to claim 45, wherein the reaction products are not known to be carcinogenic in humans.

47. The method of treatment according to claim 1, wherein the organic compound of the contaminate is from industrial manufacturing, industrial processing, chemical processing, coal tar processing, oil refining or energy generation.

48. The method of treatment according to claim 1, wherein the organic compound of the contaminate is from a natural process.

49. The method of treatment according to claim 1, wherein the organic compound of the contaminate is halogenated.

50. The method of treatment according to claim 49, wherein the halogenated organic compound of the contaminate is selected from the group consisting of a trichlorethene compound, a perchlorethene compound and a polychlorinated-biphenyl compound.

51. The method of treatment according to claim 1, wherein the microbial consortium comprises at least two of the following: a bacterial species, a fungal species and an actinomyces species.

52. The method of treatment according to claim 1, wherein the microbial consortium is known to degrade the organic compound of the contaminant.

53. The method of treatment according to claim 1, wherein the microbial consortium comprises at least two of the following: an Alcaligenes species, a Sphingomonas species, a Pseudomonas species, a Rhodotorula species, a Burkholderia species, an Ochrobactrum species, a Rhodococcus species, a Xanthomonas species and an Actinomyces species.

* * * * *

UNITED STATES PATENT AND TRADEMARK OFFICE
CERTIFICATE OF CORRECTION

PATENT NO. : 6,746,180 B2
DATED : June 8, 2004
INVENTOR(S) : Kukor et al.

It is certified that error appears in the above-identified patent and that said Letters Patent is hereby corrected as shown below:

Column 2,
Line 66, should read -- rates of $10^7$ to $10^{10}$ $M^{-1}$ $sect^{-1}$. This is... --.

Column 6,
Lines 16-17, should read -- ...microorganisms is herein referred to... --.

Column 7,
Line 44, should read -- These modifications prevent the... --.
Line 46, should read -- further render the entire... --.
Line 47, should read -- ...bioavailable degradation products... --.

Column 9,
Lines 23-23, should read -- ...and applied on a larger scale... --.

Column 21,
Line 31, should read -- ...consortium after the chemical oxidation... --.
Line 35, should read -- ...a sand, a slit, a clay, a sediment... --.

Column 23,
Line 8, should read -- ...biodegradation are non-toxic to animals. --.

Signed and Sealed this

Fourth Day of January, 2005

JON W. DUDAS
*Director of the United States Patent and Trademark Office*